(12) United States Patent
Zhang et al.

(10) Patent No.: US 12,189,897 B2
(45) Date of Patent: Jan. 7, 2025

(54) TOUCH DISPLAY DEVICE AND METHOD OF OPERATING THE TOUCH DISPLAY DEVICE

(71) Applicants: BEIJING BOE DISPLAY TECHNOLOGY CO., LTD., Beijing (CN); BOE TECHNOLOGY GROUP CO., LTD., Beijing (CN)

(72) Inventors: Yinlong Zhang, Beijing (CN); Zhihua Sun, Beijing (CN); Pengfei Hu, Beijing (CN); Senwang Li, Beijing (CN); Yanping Liao, Beijing (CN); Xibin Shao, Beijing (CN); Xiaofeng Yin, Beijing (CN); Jiantao Liu, Beijing (CN); Kaiming Shi, Beijing (CN); Jinling Zhang, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/778,975

(22) PCT Filed: Jun. 25, 2021

(86) PCT No.: PCT/CN2021/102256
§ 371 (c)(1),
(2) Date: May 23, 2022

(87) PCT Pub. No.: WO2022/266981
PCT Pub. Date: Dec. 29, 2022

(65) Prior Publication Data
US 2024/0168588 A1 May 23, 2024

(51) Int. Cl.
*G06F 3/041* (2006.01)

(52) U.S. Cl.
CPC ........ *G06F 3/04184* (2019.05); *G06F 3/0412* (2013.01)

(58) Field of Classification Search
None
See application file for complete search history.

(56) References Cited

U.S. PATENT DOCUMENTS 8,766,950 B1 7/2014 Morein et al.
10,488,964 B2 11/2019 Lee et al.
(Continued)

FOREIGN PATENT DOCUMENTS

CN 104538003 A 4/2015
CN 104731426 A 6/2015
(Continued)

*Primary Examiner* — Amare Mengistu
*Assistant Examiner* — Sarvesh J Nadkarni
(74) *Attorney, Agent, or Firm* — Dave Law Group LLC; Raj S. Davé

(57) ABSTRACT

The present invention relates to a touch display device, a drive control circuit for the touch display device, and a method for operating the touch display device. The touch display device includes a drive control circuit, the drive control circuit is configured to: in a display phase, provide a common voltage signal to a common electrode in a pixel circuit of the touch display device; in a touch phase, provide a touch drive signal to the common electrode, wherein a ratio of an average value of a high level and a low level of the touch drive signal to a value of the common voltage signal ranges from 0.8 to 1.2.

19 Claims, 8 Drawing Sheets

(56) References Cited

U.S. PATENT DOCUMENTS

| | | | |
|---|---|---|---|
| 2016/0019827 A1* | 1/2016 | Lee | G06F 3/04184 |
| | | | 345/204 |
| 2017/0090624 A1 | 3/2017 | Kwon et al. | |
| 2018/0024677 A1 | 1/2018 | Kim et al. | |
| 2018/0095597 A1 | 4/2018 | Kwon et al. | |
| 2019/0042055 A1 | 2/2019 | Hu et al. | |
| 2019/0065000 A1 | 2/2019 | Kim et al. | |
| 2019/0073085 A1 | 3/2019 | Zhang et al. | |
| 2020/0363907 A1* | 11/2020 | Heo | H10K 59/131 |
| 2021/0004103 A1* | 1/2021 | Jang | G06F 3/04184 |
| 2021/0191561 A1* | 6/2021 | Kim | G06F 3/0412 |

FOREIGN PATENT DOCUMENTS

| | | |
|---|---|---|
| CN | 106569627 A | 4/2017 |
| CN | 106933405 A | 7/2017 |
| CN | 107491232 A | 12/2017 |
| CN | 107643845 A | 1/2018 |
| CN | 107885377 A | 4/2018 |
| CN | 105260067 B | 12/2018 |
| CN | 109388281 A | 2/2019 |
| CN | 209803753 U | 12/2019 |

* cited by examiner

FIG. 12

TOUCH DISPLAY DEVICE AND METHOD OF OPERATING THE TOUCH DISPLAY DEVICE

CROSS REFERENCE TO RELATED APPLICATIONS

This patent application is a National Stage Entry of PCT/CN2021/102256 filed on Jun. 25, 2021, the disclosure of which is incorporated by reference herein in its entirety as part of the present application.

TECHNICAL FIELD

The present invention relates to the field of display technology. More specifically, it relates to a touch display device and a method for operating the touch display device.

BACKGROUND

Touch Screen Panel (TSP) is one of the simplest, most convenient and natural ways to realize human-computer interaction. With the rapid development of display technology, touch screens have gradually spread throughout people's lives. At present, there are many products using touch technology, such as mobile phones, tablet computers and so on. According to different working principles, touch screens can be divided into resistive touch screens, capacitive touch screens, and electromagnetic touch screens. According to the composition structure, the touch screen can be divided into an external type (Add on Mode), a surface covering type (On Cell), an embedded type (In Cell) and so on. The in-cell touch screen is to embed the touch electrodes of the touch screen inside the display panel. This can not only reduce the overall thickness of the module, but also reduce the production cost of the touch screen.

SUMMARY

Embodiments of the present invention provide a touch display device. The touch display device includes a drive control circuit. The drive control circuit is configured to:
in a display phase, provide a common voltage signal to a common electrode in a pixel circuit of the touch display device; in a touch phase, provide a touch drive signal to the common electrode, wherein a ratio of an average value of a high level and a low level of the touch drive signal to a value of the common voltage signal ranges from 0.8 to 1.2.

In some embodiments, the ratio of the average value of the high level and the low level of the touch drive signal to the value of the common voltage signal is 1.

In some embodiments, the drive control circuit includes a first circuit, and the first circuit includes: a common voltage signal input terminal, wherein the common voltage signal input terminal receives the common voltage signal; a first input terminal, wherein the first input terminal receives a low-level signal with a value equal to the low level of the touch drive signal; a second input terminal, wherein the second input terminal receives a high-level signal with a value equal to the high level of the touch drive signal; a first output terminal for providing the common voltage signal or the touch drive signal to the common electrode; and a first multiplexer, wherein the first multiplexer is coupled to the common voltage signal input terminal, the first input terminal, the second input terminal and the first output terminal, and is configured to: in the display phase, provide the common voltage signal from the common voltage input terminal to the first output terminal, and in the touch phase, provide the low-level signal from the first input terminal and the high-level signal from the second input terminal, alternately, to the first output terminal, as the touch drive signal.

In some embodiments, the drive control circuit is further configured to, in the display phase, provide a gate drive control signal to the gate drive circuit, wherein the gate drive control signal is for controlling the gate drive circuit to form a low level signal in the scan drive signal; during the touch phase, provide a gate-zero-load-drive signal to the gate drive circuit, wherein a ratio of an amplitude of the gate-zero-load-drive signal to an amplitude of the touch drive signal ranges from 0.8 to 1.2.

In some embodiments, the ratio of an amplitude of the gate-zero-load-drive signal to an amplitude of the touch drive signal is 1.

In some embodiments, the gate-zero-load-drive signal has a same phase as the touch drive signal.

In some embodiments, an average value of a high level and a low level of the gate-zero-load-drive signal is equal to a low level of a scan drive signal, or, a low level of the gate-zero-load-drive signal is equal to a low level of the scan drive signal.

In some embodiments, the drive control circuit includes a second circuit, and wherein the second circuit includes: a third input terminal, wherein the third input terminal receives a low level signal with a value equal to or less than the low level of the gate-zero-load-drive signal; a fourth input terminal, wherein the fourth input terminal receives a high level signal with a value equal to or greater than the high level of the gate-zero-load-drive signal; a second output terminal for providing the gate-zero-load-drive signal to the gate drive circuit; a signal control circuit, wherein the signal control circuit is coupled to the third input terminal, the fourth input terminal and the second output terminal, and is configured to: in the display phase, based on a low level signal from the third input terminal and a high level signal from the fourth input terminal, form the gate drive control signal supplied to the second output terminal; and in the touch phase, based on the low-level signal from the third input terminal and the high-level signal from the fourth input terminal, form the gate-zero-load-drive signal supplied to the second output terminal.

In some embodiments, the gate drive circuit is configured to: in the display phase, provide a scan drive signal to a gate line of the pixel circuit; in the touch phase, provide the gate-zero-load-drive signal from the drive control circuit to the gate line of the pixel circuit.

In some embodiments, the touch display device further includes a third multiplexer, wherein the third multiplexer is coupled to a source drive circuit and the drive control circuit, and is configured to: in the display phase, provide a data signal from the source drive circuit to a data line of the pixel circuit; in the touch phase, provide the touch drive signal from the drive control circuit to the data line.

In some embodiments, a difference between a high level and a low level of the touch drive signal and/or the gate-zero-load-drive signal ranges from 2.4 V to 3.6 V.

In some embodiments, the difference between the high level and the low level of the touch drive signal and/or the gate-zero-load-drive signal is 3 volts.

In some embodiments, the gate-zero-load-drive signal and/or the touch drive signal is a pulse signal.

In some embodiments, the gate-zero-load-drive signal and/or the touch drive signal is a pulse signal.

In some embodiments, the common electrode includes a plurality of electrode blocks separated from each other.

In some embodiments, the touch display device is an in-cell touch display device.

Embodiments of the present invention also provide a drive control circuit for a touch display device. The touch display device includes a pixel electrode, a gate drive circuit for providing a scan drive signal to the pixel electrode, and a source drive circuit for providing a data signal to the pixel electrode. The drive control circuit includes a first a circuit. The first circuit is configured to: provide a common voltage signal to a common electrode of the pixel circuit in a display phase; and provide a touch drive signal to a common electrode of the display panel in a touch phase, wherein a ratio of an average value of the high level and the low level of the touch drive signal to the value of the common voltage signal is in the range of 0.8 to 1.2.

In some embodiments, the ratio of the average value of the high level and the low level of the touch drive signal to the value of the common voltage signal is 1.

In some embodiments, the drive control circuit further includes a second circuit. The second circuit is configured to provide a gate-zero-load-drive signal to the gate drive circuit during the touch phase, wherein the ratio of the amplitude of the gate-zero-load-drive signal to the amplitude of the touch drive signal is in the range of 0.8 to 1.2.

In some embodiments, the ratio of the amplitude of the gate-zero-load-drive signal to the amplitude of the touch drive signal is 1.

Embodiments of the present invention also provide a driving method for operating a touch display device. The method includes: in a display phase, providing a common voltage signal to a common electrode in a pixel circuit of the touch display device by a drive control circuit of the touch display device; and in the touch phase, providing a touch drive signal to the common electrode by the drive control circuit, wherein a ratio of an average value of a high level and a low level of the touch drive signal to a value of the common voltage signal ranges from 0.8 to 1.2.

In some embodiments, the ratio is 1.

In some embodiments, the touch drive signals includes multiple high levels and multiple low levels, wherein each of high levels is equal, and wherein each of low levels is equal.

In some embodiments, the method further includes: in the display phase, providing a gate drive control signal to the gate drive circuit by the drive control circuit, wherein the gate drive control signal is for controlling the gate drive circuit to form a low level signal of a scan drive signal; in the touch phase, providing a gate-zero-load-drive signal to a gate drive circuit by the drive control circuit, wherein a ratio of an amplitude of the gate-zero-load-drive signal to an amplitude of the touch drive signal ranges from 0.8 to 1.2.

In some embodiments, the ratio of the amplitude of the gate-zero-load-drive signal to the amplitude of the touch drive signal is 1.

In some embodiments, the gate-zero-load-drive signal and the touch drive signal have a same phase.

In some embodiments, an average value of a high level and a low level of the gate-zero-load-drive signal is equal to a value of a low level of the scan drive signal, or, a value of the low level of the gate-zero-load-drive signal is equal to a value of the low level of the scan drive signal.

In some embodiments, the method further includes: in the display phase, providing a data signal from a source drive circuit to a data line of the pixel circuit by the third multiplexer; and in the touch phase, providing the touch drive signal to the data line by the third multiplexer.

In some embodiments, the gate-zero-load-drive signal and/or the touch drive signal is a pulse signal.

In some embodiments, the display phase and the touch phase alternate in time.

In some embodiments, the touch drive signal is obtained by modulating the common voltage signal; the gate-zero-load-drive signal is obtained by modulating the gate drive control signal, wherein the gate drive control signal is for controlling the gate drive circuit to form a low level signal in the scan drive signal.

BRIEF DESCRIPTION OF THE DRAWINGS

In order to explain the technical solutions of the embodiments of the present disclosure more clearly, the drawings of the embodiments will be briefly described below. It should be understood that the drawings described below only relate to some embodiments of the present disclosure, instead of being a limit to the present disclosure, in which.

DETAILED DESCRIPTION

In order to make the objectives, technical solutions, and advantages of the embodiments of the present disclosure clearer, the technical solutions of the embodiments of the present disclosure will be described clearly and completely in conjunction with the accompanying drawings. Obviously, the described embodiments are part of the embodiments of the present disclosure, rather than all of the embodiments. Based on the described embodiments of the present disclosure, all other embodiments obtained by those skilled in the art without creative labor are also belonging to the protection scope of the present disclosure.

When the elements and the embodiments thereof of the present application are introduced, the articles "a/an", "one", "the" and "said" are intended to represent the existence of one or more elements. The expressions "comprise", "include", "contain" and "have" are intended as inclusive and mean that there may be other elements besides those listed.

For purposes of the description hereinafter, the terms "upper", "lower", "right", "left", "vertical", "horizontal", "top", "bottom", and derivatives thereof shall relate to the invention, as it is oriented in the drawing figures. The terms "overlying", "atop", "positioned on" or "positioned atop" means that a first element, such as a first structure, is present on a second element, such as a second structure, wherein intervening elements, such as an interface structure, e.g. interface layer, may be present between the first element and the second element. The term "direct contact" means that a first element, such as a first structure, and a second element, such as a second structure, are connected with or without any additional elements at the interface of the two elements.

Unless otherwise defined, all terms (including technical and scientific terms) used herein have the same meaning as commonly understood by one of ordinary skill in the art to which this inventive subject matter belongs. It will be further understood that terms such as those defined in commonly used dictionaries should be interpreted to have meanings consistent with their meanings in the context of the specification and related art, and will not be interpreted in an idealized or overly formalized form, unless otherwise expressly defined herein. As used herein, the statement that two or more parts are "connected" or "coupled" together shall mean that the parts are joined together directly or through one or more intervening components.

Undesirable parasitic capacitances exist in the display panel in a touch display device. For example, parasitic capacitance may exist between data lines, gate lines and common electrodes. Undesirable parasitic capacitances can degrade the performance of touch display devices. For example, it may increase the load of touch operations, reduce the accuracy of touch sensing, and in severe cases, make it impossible to perform touch sensing.

Figure 1:
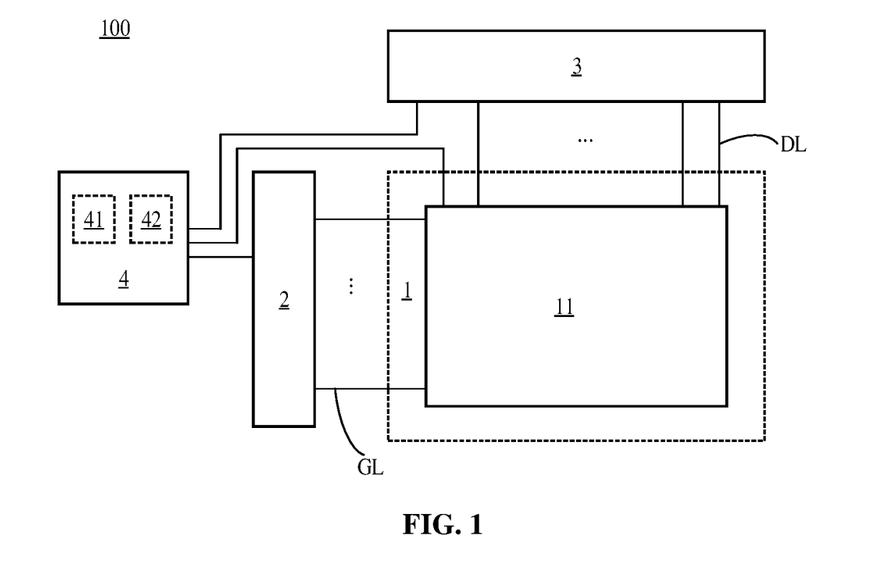
FIG. 1 is a schematic view of a touch display device according to an embodiment of the present invention.

FIG. 1 is a schematic block view of a touch display device according to an embodiment of the present invention. As shown in FIG. 1, a touch display device 100 according to an embodiment of the present invention includes a pixel circuit 11, a gate drive circuit 2, a source drive circuit 3 and an a drive control circuit 4 coupled to the pixel circuit 11, the gate drive circuit 2, and the source drive circuit 3.

The gate drive circuit 2 is used for supplying a scan drive signal to the pixel circuit 11. For example, the gate drive circuit 2 may supply a scan drive signal to a gate line GL of the pixel circuit. The gate drive circuit 2 may be provided only on one side of the display panel 1. However, the gate drive circuits 2 may be provided on an opposite side of the display panel 1 or integrated into the display panel 1 according to requirements of a driving method, a panel design method, and the like.

The source drive circuit 3 is used to supply a data signal to the pixel circuit 11. For example, the source drive circuit may provide data signals to the data lines DL of the pixel circuits. The source drive circuit 3 may be provided only on one side of the display panel 1. However, according to the requirements of the driving method, the panel design method, and the like, the source drive circuits 3 may be provided on an opposite side of the display panel 1 or integrated into the display panel 1.

The drive control circuit 4 is configured to, in the display phase, provide the common voltage signal to the common electrodes in the display panel; in the touch phase, to provide a touch drive signal to the common electrode, wherein a ratio of an average value of the high level and the low level of the touch drive signal to a value of the common voltage signal ranges from 0.8 to 1.2. For example, the ratio of the two may be 0.8 or 1.2. In some embodiments, the ratio of the average value of the high level and the low level of the touch drive signal to the value of the common voltage signal is 1.

Figure 2:
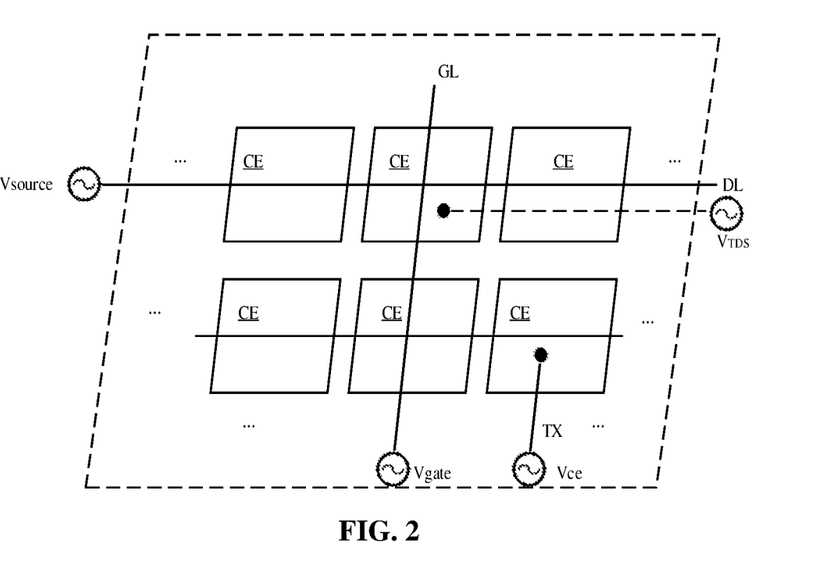
FIG. 2 is a partial schematic view of a touch display device according to an embodiment of the present invention.

FIG. 2 is a partial schematic view of a touch display device according to an embodiment of the present invention. As shown in FIG. 2, the common electrode CE may include a plurality of common electrode blocks separated from each other. Common electrodes can also be used as touch electrodes. In the display phase, the common electrode has a common voltage Vcom applied thereto as a display drive signal. In the touch phase, the common electrode has a touch drive signal VTDS applied thereto. Generally, overlapping among the data line DL, the gate line GL, and the TX line connected to the common electrode often results in undesired parasitic capacitances. The touch display device of the embodiment of the present invention can reduce or even eliminate these undesired parasitic capacitances.

Figure 3:
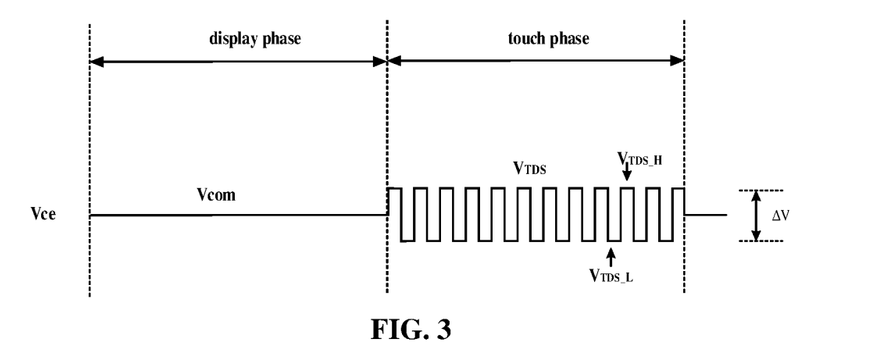
FIG. 3 is a schematic view of a signal applied to a common electrode of a touch display device according to an embodiment of the present invention.

FIG. 3 is a schematic view of a signal Vce applied to a common electrode of a touch display device according to an embodiment of the present invention. Referring to FIG. 3, the drive control circuit supplies the common voltage signal Vcom to the common electrode CE in the display panel in the display phase. The drive control circuit provides the touch drive signal VTDS to the common electrode CE in the touch phase. Wherein, FIG. 3 takes the touch drive signal VTDS as a first square wave signal as an example. In other embodiments, the touch drive signal may be a pulse signal whose duty cycle is not 50%. The average value of the high level VTDS_H and the low level VTDS_L of the first square wave signal is equal to the value of the common voltage signal Vcom. In this way, it is equivalent to superimposing a square wave signal on the basis of the existing Vcom in the display phase for the touch phase, without the need to pull the voltage of Vcom to zero and then superimposing the square wave signal. The solution of superimposing the square wave signal after pulling the voltage of Vcom to zero will cause abnormal display, and because it takes extra time to switch the voltage to zero, the real-time performance is poor. However, the solutions of the embodiments of the present invention can avoid these problems. It should be noted that in FIG. 3, the ratio of the average value of the high level VTDS_H and the low level VTDS_L of the touch drive signal to the value of the common voltage signal is 1 as an example, and the ratio of the two is not limited to that shown in FIG. 3. For example, the ratio of the average value of the high level VTDS_H and the low level VTDS_L of the touch drive signal to the value of the common voltage signal may be in the range of 0.8 to 1.2.

The difference between the high level VTDS_H and the low level VTDS_L is recorded as $\Delta V$. In some embodiments, $\Delta V$ may be set to be in the range of 2.4-3.6V. For example, in some embodiments, $\Delta V$ may be set to 3V.

Figure 4:
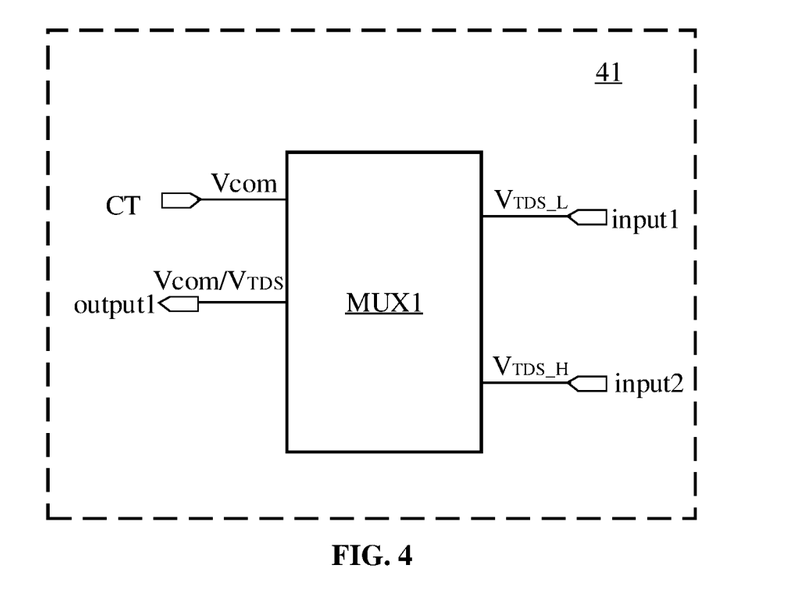
FIG. 4 is a schematic view of a drive control circuit according to an embodiment of the present invention.

FIG. 4 is a schematic view of a drive control circuit according to an embodiment of the present invention. As shown in FIG. 4, the drive control circuit may include a first circuit 41. The first circuit 41 includes a common voltage signal input terminal CT which receives a common voltage signal Vcom, a first input terminal input1 which receives a low level signal VTDS_L whose value is equal to the low level of the touch drive signal VTDS, and a second input terminal input2 which receives a high level signal VTDS_H whose value is equal to the high level of the touch drive signal VTDS, a first output terminal output1 which is used to provide the common voltage signal Vcom or the touch drive signal VTDS to the common electrode, and the first multiplexer MUX1 coupled to the common voltage signal input terminal CT, the first input terminal input1, the second input terminal input2 and the first output terminal output1. The first multiplexer is configured to: in the display phase, supply the common voltage signal Vcom from the common voltage input terminal CT to the first output terminal output1, and in the touch phase, supply the low-level signal VTDS_L from the first input terminal input1 and the high-level signal VTDS_H from the second input terminal input2, alternately, to the first output terminal, as the touch drive signal VTDS.

Figure 5A:
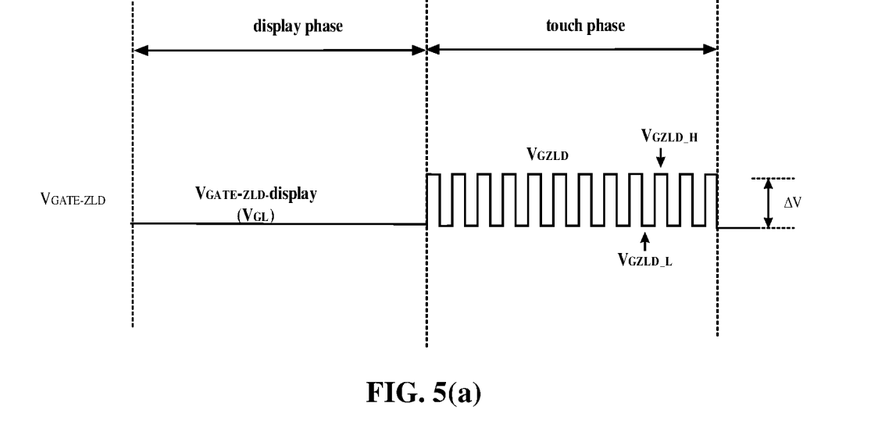
FIGS. 5(a) and 5(b) are schematic views of signals provided by the drive control circuit to the gate drive circuit according to an embodiment of the present invention.
Figure 5B:
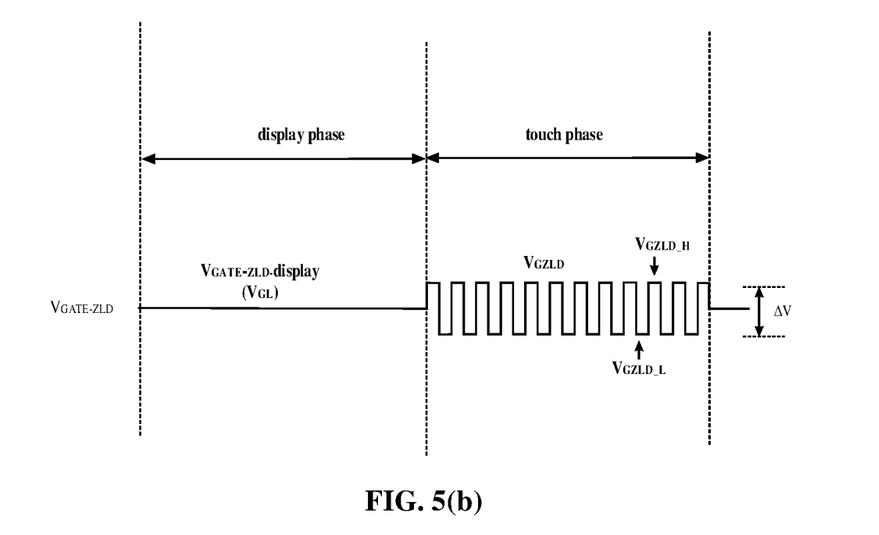

FIG. 5(a) and FIG. 5(b) are schematic views of the signal VGATE-ZLD provided by the drive control circuit to the gate drive circuit according to an embodiment of the present invention. Referring to FIG. 5, the drive control circuit 4 may also be configured to: in the touch phase, provide the gate-zero-load-drive signal VGZLD to the gate drive circuit 2, wherein the amplitude of the gate-zero-load-drive signal VGZLD is the same as that of the touch drive signal. In other words, the difference between the high level VGZLD_H and the low level VGZLD_L of the gate-zero-load-drive signal is also the aforementioned $\Delta V$. In some embodiments, the difference between the high level VGZLD_H and the low level VGZLD_L of the gate-zero-load-drive signal may also be 3V. It should be noted that FIG. 5(a) and FIG. 5(b) take as an example that the amplitude of the gate-zero-load-drive signal VGZLD is the same as the amplitude of the aforementioned touch drive signal. The ratio of the amplitude of the gate-zero-load-drive signal VGZLD to the amplitude of the touch drive signal may also be set in the range of 0.8 to 1.2 according to requirements. Accordingly, the difference between the high level VGZLD_H and the low level VGZLD_L of the gate-zero-load-drive signal may be in the range of 2.4-3.6V. In some embodiments, the gate-zero-load-drive signal VGZLD has the same phase as the touch drive signal VTDS.

As shown in FIG. 5(a) and FIG. 5(b), the drive control circuit 4 may be configured to provide a gate drive control signal VGATE-ZLD-display to the gate drive circuit in the display phase. The gate drive control signal VGATE-ZLD-display is used to control the gate drive circuit to form a low level signal VGL of the scan drive signal VG. The value of the gate drive control signal VGATE_ZLD-display may be set to be the same as the value of the low level VGL of the scan drive signal. In some embodiments, as shown in FIG. 5(a), the value of the low level VGZLD_L of the gate-zero-load-drive signal may be equal to the value of the gate drive control signal VGATE_ZLD-display. In other embodiments, as shown in FIG. 5(b), the average value of the high level VGZLD_H and the low level VGZLD_L of the gate-zero-load-drive signal may be equal to the value of the gate drive control signal VGATE_ZLD-display.

In some embodiments, the gate drive circuit is configured to provide a scan drive signal VG to a gate line of the pixel circuit during a display phase, and provide a gate-zero-load-drive signal from the drive control circuit to the gate line of the pixel circuit during a touch phase.

Figure 6A:
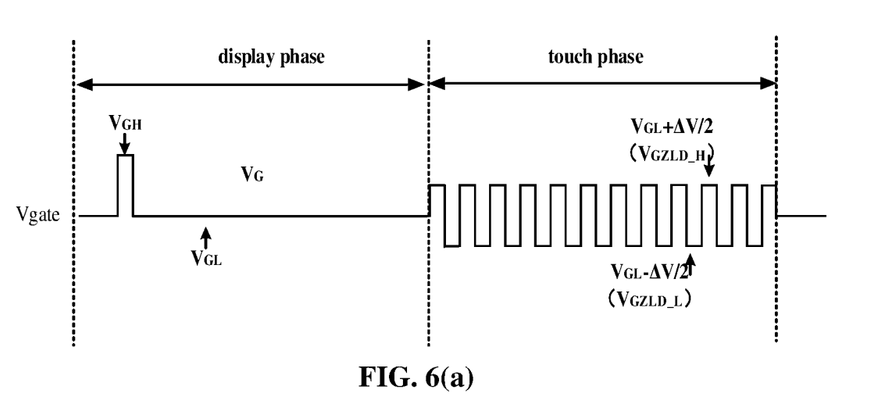
FIGS. 6(a) and 6(b) are schematic views of signals received by a gate line according to an embodiment of the present invention.
Figure 6B:
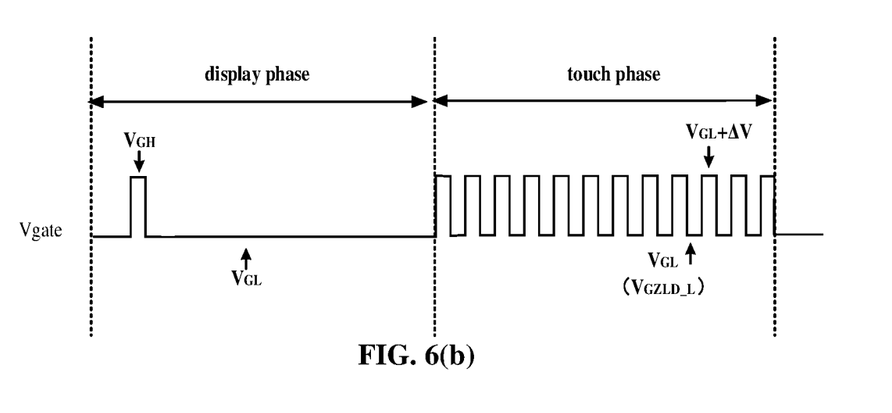

FIG. 6(a) and FIG. 6(b) are schematic views of a signal Vgate received by a gate line according to an embodiment of the present invention. As shown in FIG. 6(a) and FIG. 6(b), in the display phase, the gate line receives the scan drive signal VG, while in the touch phase, the gate line also receives the signal from the drive control circuit, wherein the amplitude and phase of the signal can be the same as those of the gate-zero-load-drive signal. In some embodiments, as shown in FIG. 6(a), the average value of the high level VGZLD_H and the low level VGZLD_L of the gate-zero-load-drive signal is equal to the value of the low level VGL of the scan drive signal VG. In other embodiments, as shown in FIG. 6(b), the value of the low level VGZLD_L of the gate-zero-load-drive signal is equal to the value of the low level VGL of the scan drive signal. As shown in FIG. 6, the scan drive signal VG in the display phase includes a high level VGH and a low level VGL. The high level VGH may be supplied to the gate drive circuit 2 by a power management circuit 6 (see FIG. 8) of the touch display device, and then supplied to the gate lines by the gate drive circuit 2. The low level VGL may be provided by the power management circuit 6 (see FIG. 8) to the drive control circuit 4, by the drive control circuit 4 to the gate drive circuit 2 (see FIG. 5), and then by the gate drive circuit 2 to the gate line.

This allows the voltage difference between the common electrode and the gate line to remain unchanged for the touch phase, thereby reducing unwanted parasitic capacitance between the common electrode and the gate line.

Figure 7:
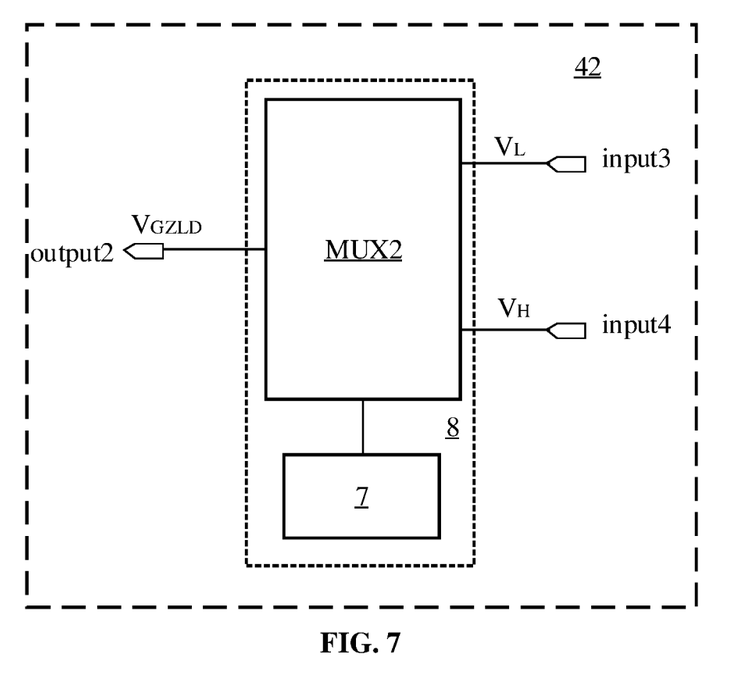
FIG. 7 is a partial schematic view of a drive control circuit according to an embodiment of the present invention.
Figure 8:
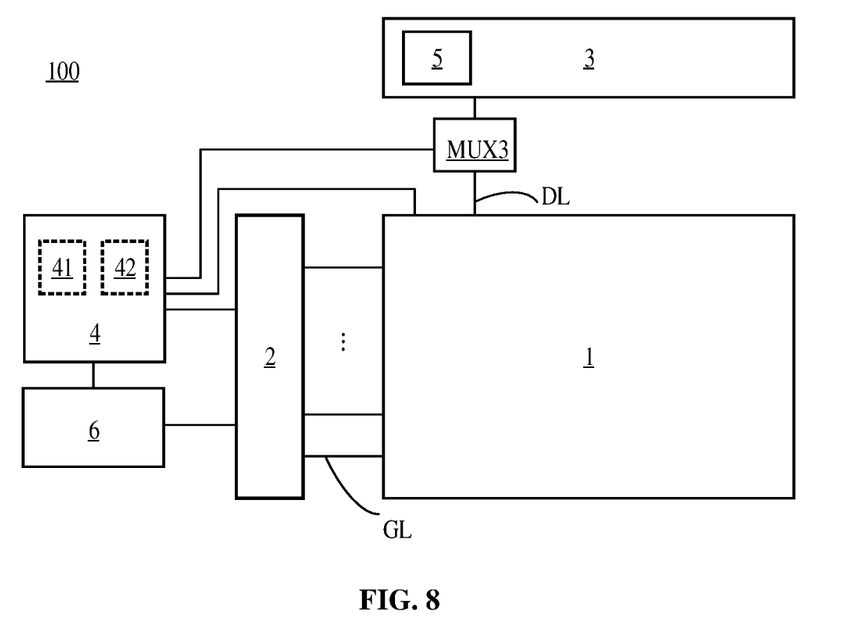
FIG. 8 is a schematic view of a touch display device according to an embodiment of the present invention.

FIG. 7 is a partial schematic view of a drive control circuit according to an embodiment of the present invention. As shown in FIG. 7, the drive control circuit 4 further includes a second circuit 42. The second circuit 42 includes a third input terminal input3, a fourth input terminal input4, a second output terminal output2 and a signal control circuit 8. The third input terminal input3 is supplied with a low-level signal VL whose value is equal to or less than the low level of the gate-zero-load-drive signal VGZLD. The fourth input terminal input4 is supplied with a value equal to or greater than the high-level signal VH of the gate-zero-load-drive signal VGZLD. The second output terminal output2 is used for providing the gate-zero-load-drive signal VGZLD to the gate drive circuit 2. The signal control circuit 8 is coupled to the third input terminal input3, the fourth input terminal input4 and the second output terminal output2, and is configured to, in the touch phase, based on the low-level signal VL from the third input terminal input3 and the high-level VGZLD_H signal from the four input terminal input4, form the gate-zero-load-drive signal VGZLD which is supplied to the second output terminal output2. The signal control circuit 8 may further include a second multiplexer MUX2 and an amplitude control circuit 7. The second multiplexer MUX2 is coupled to the input terminal input3, the fourth input terminal input4 and the second output terminal output2. The third amplitude control circuit is used to control the amplitude of the signal VGZLD output from the second output terminal output2. For example, the amplitude control circuit 7 may include a digital-to-analog converter and an operational amplifier. FIG. 8 is a schematic view of a touch display device according to an embodiment of the present invention. As shown in FIG. 8, the touch display device 100 according to an embodiment of the present invention further includes a third multiplexer MUX3. The third multiplexer MUX3 is coupled to the source drive circuit 3 and the drive control circuit 4.

Figure 9:
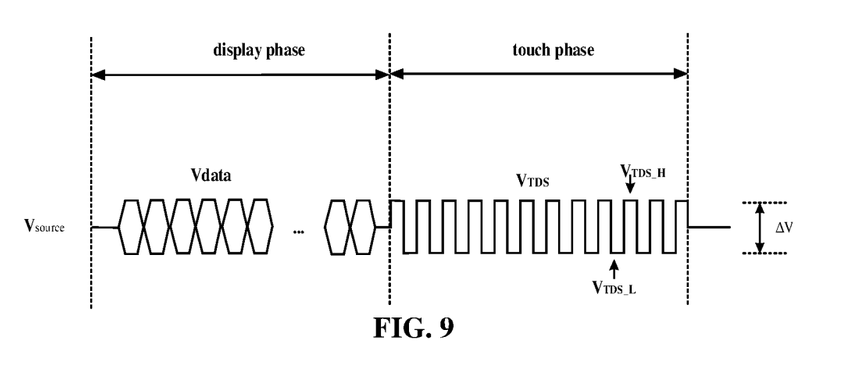
FIG. 9 is a schematic view of a signal provided to a data line by a third multiplexer according to an embodiment of the present invention.

FIG. 9 is a schematic view of the signal Vsource provided to the data line by the third multiplexer according to the present invention. Referring to FIG. 9, the third multiplexer MUX3 is configured to, in the display phase, supply the data signal Vdata from the source drive circuit 3 to the data line DL; in the touch phase, supply the touch drive signal VTDS from the drive control circuit 4 to the data line DL. It can be understood that the data signal waveforms shown in FIG. 9 are for illustration only. The data signal Vdata of each data line is not necessarily the same, and the value of the data signal Vdata of each data line can be determined according to a grayscale value of the image to be displayed.

Such a solution can make the signal received on the data line be the same as the signal received on the common electrode during the touch phase, so that the voltage difference between the common electrode and the data line is zero. Therefore, undesired parasitic capacitance between the common electrode and the data line can be reduced. At the same time, the voltage difference between the data line and the gate line can also remain unchanged during the touch phase, so that the undesired parasitic capacitance between the data line and the gate line can also be reduced.

As shown in FIG. 8, the touch display device may further include a sensing unit 5. The touch sensing unit 5 is configured to measure the capacitance change of the common electrode to which the touch drive signal is applied, and to detect touch and a touch point coordinate according to the capacitance change.

The touch display device 100 may be an in-cell touch display device. For example, the touch display device 100 may include a mobile phone, a tablet computer, an electronic reading paper, an outdoor display screen, etc. with an in-cell touch function, which is not specifically limited in the present disclosure.

Figure 10:
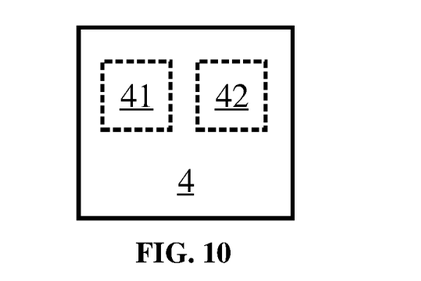
FIG. 10 is a schematic view of a drive control circuit for a touch display device according to an embodiment of the present invention.

FIG. 10 is a schematic view of a drive control circuit for a touch display device according to an embodiment of the present invention. Referring to FIG. 1, the touch display device may include a pixel electrode 11, a gate drive circuit 2 for providing a scan drive signal to the pixel electrodes 11, and a source drive circuit 3 for providing a data signal to the pixel electrode 11.

As shown in FIG. 10, the drive control circuit 4 according to an embodiment of the present invention may include a first circuit 41. Referring to FIG. 3 and FIG. 4, the first circuit 41 may be configured to, in the display phase, provide the common voltage signal Vce to the common electrode of the pixel circuit; in the touch phase, provide the touch drive signal VTDS to the common electrode, wherein, a ratio of an average value of the high level VTDS_H and the low level VTDS_L of the touch drive signal VTDS to a value of the common voltage signal Vcom is ranges from 0.8 to 1.2. For example, in some embodiments, the ratio of the average value of the high level VTDS_H and the low level VTDS_L of the touch drive signal VTDS to the value of the common voltage signal Vcom is 1. The specific structure of the first circuit 41 can be referred to FIG. 4, which will not be repeated here.

The drive control circuit 4 according to an embodiment of the present invention may include a second circuit 42. Referring to FIG. 7, the second circuit 42 may be configured to, during the touch phase, provide the gate-zero-load-drive signal VGZLD to the gate drive circuit, wherein a ratio of the amplitude of the gate-zero-load-drive signal VGZLD to the amplitude of the first square wave signal is in the range of 0.8 to 1.2gate-zero-load-drive. In some embodiments, the ratio of the amplitude of the gate-zero-load-drive signal VGZLD to the amplitude of the first square wave signal is 1. For the specific structure of the second circuit 42, reference may be made to FIG. 7, which will not be repeated here.

Figure 11:
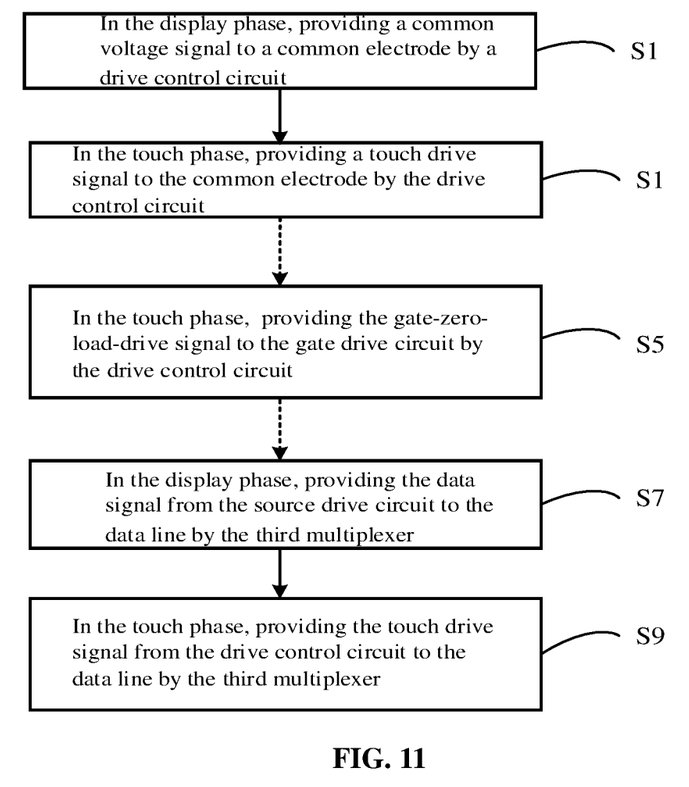
FIG. 11 is a flowchart of a method for operating the aforementioned touch display device 100 according to an embodiment of the present invention.

FIG. 11 is a flowchart of a method for operating the aforementioned touch display device 100 according to an embodiment of the present invention. As shown in FIG. 11, the method for operating the aforementioned touch display device 100 according to the present invention includes:

S1. In the display phase, providing a common voltage signal to a common electrode by a drive control circuit of the touch display device.

S3. In the touch phase, providing a touch drive signal to the common electrode in a pixel circuit of the touch display device by the drive control circuit. A ratio of an average value of a high level and a low level of the touch drive signal to a value of the common voltage signal ranges from 0.8 to 1.2. For example, the ratio of the average value of the high level and the low level of the touch drive signal to the value of the common voltage signal may be 1. In some embodiments, in the first touch drive signal, each high level is equal and each low level is equal. In some embodiments, the touch drive signal may be a pulse signal. In some embodiments, the touch drive signal may be a square wave signal.

S5. In the touch phase, providing the gate-zero-load-drive signal to the gate drive circuit by the drive control circuit. The ratio of the amplitude of the gate-zero-load-drive signal to the amplitude of the touch drive signal is in the range of 0.8 to 1.2. For example, the ratio of the amplitude of the gate-zero-load-drive signal to the amplitude of the touch drive signal is 1. The gate-zero-load-drive signal can also have the same phase as the touch drive signal. In some embodiments, the gate-zero-load-drive signal may be a pulse signal. In some embodiments, the gate-zero-load-drive signal may be a square wave signal. The average value of the high level and the low level of the gate-zero-load-drive signal is equal to the value of the low level of the scan drive signal, or, the value of the low level of the gate-zero-load-drive signal is equal to the value of the low level of the scan drive signal.

S7. In the display phase, providing the data signal from the source drive circuit to the data line by the third multiplexer.

S9. In the touch phase, providing the touch drive signal from the drive control circuit to the data line by the third multiplexer. In this way, in the touch phase, the signal received on the data line is the same as the signal received on the common electrode.

The display phase and the touch phase may alternate in time. For the method for operating a touch display according to an embodiment of the present invention, the touch display device may be the touch display device described above, and details will not be described again.

Figure 12:
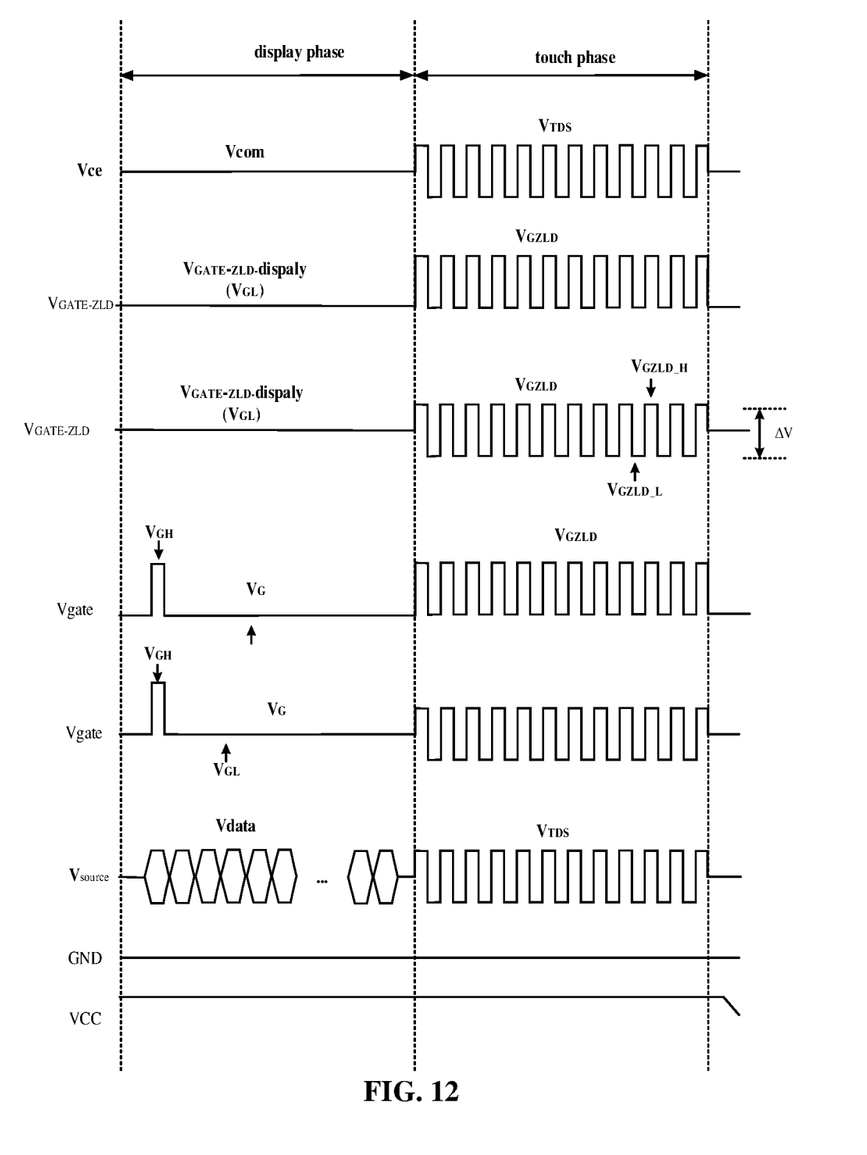
FIG. 12 is a schematic view of various signals according to an embodiment of the present invention.

FIG. 12 is a schematic view of various signals according to an embodiment of the present invention. As shown in FIG. 12, in the display phase and the touch phase, the ground voltage GND of the drive control circuit and the power supply voltage VCC provided by the power management circuit 6 to the gate drive circuit 2 can remain unchanged, that is, the ground voltage GND can be same as the supply voltage VCC in the display phase and the touch phase. It can be seen from FIG. 12 that the touch drive signal VTDS is generated by modulating the common voltage signal Vcom, and the gate-zero-load-drive signal VGZLD is generated by modulating the gate drive control signal VGATE-ZLD-display which is used to generate a low level VGL in the scanning signal VG for driving the gate drive circuit.

Certain specific embodiments have been described, and these embodiments are only shown by way of example and are not intended to limit the scope of the present disclosure. In fact, the novel embodiments described herein can be implemented in various other forms; in addition, various omissions, substitutions and changes in the form of the embodiments described herein can be made without departing from the spirit of the present disclosure. The appended claims and their equivalents are intended to cover such forms or modifications that fall within the scope and spirit of the present disclosure.

What is claimed is:

1. A touch display device, comprising:
a drive control circuit, the drive control circuit is configured to:
in a display phase, provide a common voltage signal to a common electrode in a pixel circuit of the touch display device;
in a touch phase, provide a touch drive signal to the common electrode, wherein a ratio of an average value of a high level and a low level of the touch drive signal to a value of the common voltage signal ranges from 0.8 to 1.2,
wherein the drive control circuit comprises a first circuit, and the first circuit comprises:
a common voltage signal input terminal, wherein the common voltage signal input terminal receives the common voltage signal;
a first input terminal, wherein the first input terminal receives a low-level signal with a value equal to the low level of the touch drive signal;
a second input terminal, wherein the second input terminal receives a high-level signal with a value equal to the high level of the touch drive signal:
a first output terminal for providing the common voltage signal or the touch drive signal to the common electrode; and
a first multiplexer, wherein the first multiplexer is coupled to the common voltage signal input terminal, the first input terminal, the second input terminal and the first output terminal, and is configured to:
in the display phase, provide the common voltage signal from the common voltage input terminal to the first output terminal, and
in the touch phase, provide the low-level signal from the first input terminal and the high-level signal from the second input terminal, alternately, to the first output terminal, as the touch drive signal.

2. The touch display device according to claim 1, wherein the drive control circuit is further configured to
in the display phase, provide a gate drive control signal to a gate drive circuit, wherein the gate drive control signal is for controlling the gate drive circuit to form a low level signal in the scan drive signal;
during the touch phase, provide a gate-zero-load-drive signal to the gate drive circuit, wherein a ratio of an amplitude of the gate-zero-load-drive signal to an amplitude of the touch drive signal ranges from 0.8 to 1.2.

3. The touch display device according to claim 2, wherein the gate-zero-load-drive signal and the touch drive signal have a same phase.

4. The touch display device according to claim 2, wherein an average value of a high level and a low level of the gate-zero-load-drive signal is equal to a low level of a scan drive signal, or,
a low level of the gate-zero-load-drive signal is equal to a low level of the scan drive signal.

5. The touch display device according to claim 2, wherein the drive control circuit comprises a second circuit, and wherein the second circuit comprises:

a third input terminal, wherein the third input terminal receives a low level signal with a value equal to or less than the low level of the gate-zero-load-drive signal;
a fourth input terminal, wherein the fourth input terminal receives a high level signal with a value equal to or greater than the high level of the gate-zero-load-drive signal;
a second output terminal for providing the gate-zero-load-drive signal to the gate drive circuit;
a signal control circuit, wherein the signal control circuit is coupled to the third input terminal, the fourth input terminal and the second output terminal, and is configured to:
in the display phase, based on a low level signal from the third input terminal and a high level signal from the fourth input terminal, form the gate drive control signal supplied to the second output terminal; and
in the touch phase, based on the low-level signal from the third input terminal and the high-level signal from the fourth input terminal, form the gate-zero-load-drive signal supplied to the second output terminal.

6. The touch display device according to claim 2, wherein the gate drive circuit is configured to:
in the display phase, provide a scan drive signal to a gate line of the pixel circuit;
in the touch phase, provide the gate-zero-load-drive signal from the drive control circuit to the gate line of the pixel circuit.

7. The touch display device according to claim 6, further comprising:
a third multiplexer, wherein the third multiplexer is coupled to a source drive circuit and the drive control circuit of the touch display device, and is configured to:
in the display phase, provide a data signal from the source drive circuit to a data line of the pixel circuit;
in the touch phase, provide the touch drive signal from the drive control circuit to the data line.

8. The touch display device according to claim 1, wherein the touch display device satisfies one of:
i) a difference between a high level and a low level of the touch drive signal ranges from 2.4 V to 3.6 V;
ii) a difference between a high level and a low level of the gate-zero-load-drive signal ranges from 2.4 V to 3.6 V; or
iii) a difference between a high level and a low level of the touch drive signal ranges from 2.4 V to 3.6 V, and a difference between a high level and a low level of the gate-zero-load-drive signal ranges from 2.4 V to 3.6 V.

9. The touch display device according to claim 1, wherein the touch display device satisfies one of:
i) a gate-zero-load-drive signal is a pulse signal;
ii) the touch drive signal is a pulse signal; or
iii) a gate-zero-load-drive signal is a pulse signal, and the touch drive signal is a pulse signal.

10. The touch display device according to claim 1, wherein the common electrode comprises a plurality of electrode blocks separated from each other.

11. The touch display device according to claim 1, wherein the touch display device is an in-cell touch display device.

12. A method for driving a touch display device, comprising:
in a display phase, providing a common voltage signal to a common electrode in a pixel circuit of the touch display device by a drive control circuit of the touch display device; and in the touch phase, providing a touch drive signal to the common electrode by the drive control circuit, wherein a ratio of an average value of a high level and a low level of the touch drive signal to a value of the common voltage signal ranges from 0.8 to 1.2, wherein the drive control circuit comprises a first circuit, and the first circuit comprises:

a common voltage signal input terminal, wherein the common voltage signal input terminal receives the common voltage signal;

a first input terminal, wherein the first input terminal receives a low-level signal with a value equal to the low level of the touch drive signal;

a second input terminal, wherein the second input terminal receives a high-level signal with a value equal to the high level of the touch drive signal;

a first output terminal for providing the common voltage signal or the touch drive signal to the common electrode; and a first multiplexer, wherein the first multiplexer is coupled to the common voltage signal input terminal, the first input terminal, the second input terminal and the first output terminal, and is configured to:

in the display phase, provide the common voltage signal from the common voltage input terminal to the first output terminal, and in the touch phase, provide the low-level signal from the first input terminal and the high-level signal from the second input terminal, alternately, to the first output terminal, as the touch drive signal.

13. The method according to claim 12, wherein the touch drive signal comprises multiple high levels and multiple low levels, wherein each of the high levels is equal, and wherein each of the low levels is equal.

14. The method according to claim 12, further comprising:

in the display phase, providing a gate drive control signal to the gate drive circuit by the drive control circuit, wherein the gate drive control signal is for controlling the gate drive circuit to form a low level signal of a scan drive signal;

in the touch phase, providing a gate-zero-load-drive signal to a gate drive circuit of the touch display device by the drive control circuit, wherein a ratio of an amplitude of the gate-zero-load-drive signal to an amplitude of the touch drive signal ranges from 0.8 to 1.2.

15. The method according to claim 14, wherein the gate-zero-load-drive signal and the touch drive signal have a same phase.

16. The method according to claim 14, wherein an average value of a high level and a low level of the gate-zero-load-drive signal is equal to a value of a low level of the scan drive signal, or, a value of the low level of the gate-zero-load-drive signal is equal to a value of the low level of the scan drive signal.

17. The method of claim 12, further comprising:

in the display phase, providing a data signal from a source drive circuit to a data line of the pixel circuit by a third multiplexer of the touch display device; and in the touch phase, providing the touch drive signal to the data line by the third multiplexer.

18. The method according to claim 12, wherein the touch display device satisfies one of:

i) a gate-zero-load-drive signal is a pulse signal;
ii) the touch drive signal is a pulse signal; or
iii) a gate-zero-load-drive signal is a pulse signal, and the touch drive signal is a pulse signal.

19. The method according to claim 12, wherein, the touch drive signal is obtained by modulating the common voltage signal;

the gate-zero-load-drive signal is obtained by modulating the gate drive control signal, wherein the gate drive control signal is for controlling the gate drive circuit to form a low level signal in the scan drive signal.

* * * * *